F. F. KANNE.

HORSE COLLAR PAD.

No. 10,492. Reissued June 24, 1884.

WITNESSES

S. V. Mottaghaul,

Geo. F. Downing.

INVENTOR

F. F. Kanne.

By W. A. Symmons,

Attorney

N. PETERS, Photo-Lithographer, Washington, D. C.

UNITED STATES PATENT OFFICE.

FRIDERICK FRANK KANNE, OF WATERVILLE, MINNESOTA.

HORSE-COLLAR PAD.

SPECIFICATION forming part of Reissued Letters Patent No. 10,492, dated June 24, 1884.

Original No. 251,600, dated December 27, 1881. Application for reissue filed November 7, 1883.

*To all whom it may concern:*

Be it known that I, FRIDERICK FRANK KANNE, of Waterville, in the county of Le Sueur and State of Minnesota, have invented a new and useful Improvementin Collar-Pads; and I do hereby declare that the following is a full, clear, and exact description of the same, reference being had to the accompanying drawings, forming part of this specification, in which—

Figure 1:
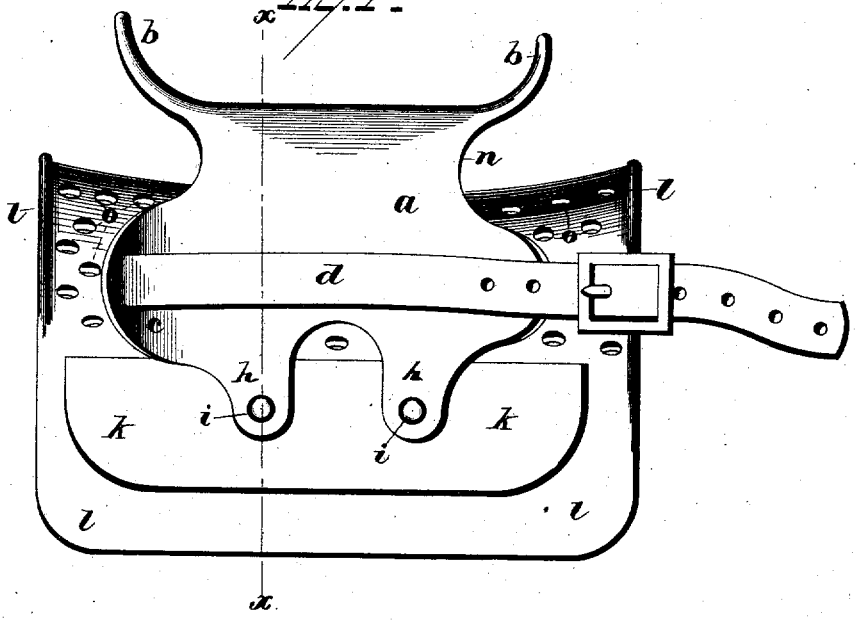
Figure 2:
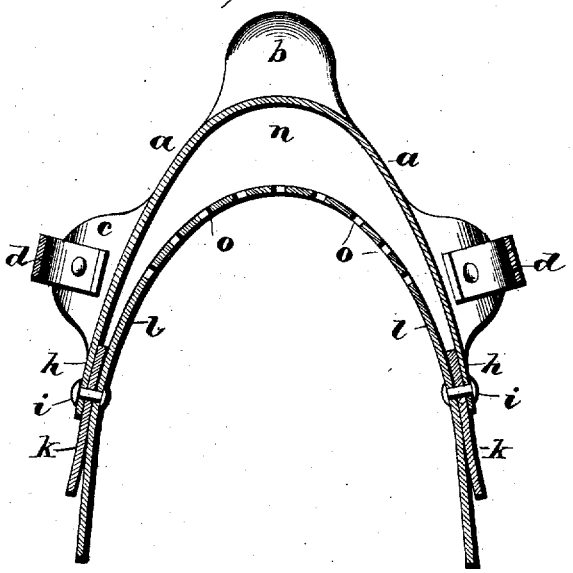

Figure 1 is a side elevation of my improved collar-pad and frame. Fig. 2 is a section on line *x x* of Fig. 1.

My invention relates to improvements in collar-pads; and it consists in the peculiar construction and arrangement of the parts, as hereinafter more fully set forth.

In the accompanying drawings, *a* represents a scalloped metallic arched frame adapted to conform with the lower face of the upper end of a horse-collar and form a seat therefor. The arched frame *a* is provided on its top with the end bent or curved projections, *b*, and on its opposite sides with the curved projections *c*, whereby, when the collar is in place or seated on the arched frame *a*, it will be held in place by the bent projections *b c* of the metal frame. The curved projections *b c* are formed in the same piece with the arched frame *a*. To the side projections, *c*, of the arched frame *a* are secured the transverse straps *d*, whereby the arched frame *a* is secured to and under the horse-collar at its upper end. *h h* represent lugs on the lower ends of the opposite sides of the arched frame *a*, through perforations in each of which pass the rivets *i*, which pass thence through opposite pieces of leather *k*, and through a leather pad, *l*, arranged concentrically under the curved arched frame *a*, with an air-space, *n*, between them. *o* represents perforations in the pad lying under the curved frame *a*, designed for admission of air to the neck of the horse.

By this construction it will be seen that my improved pad can readily be applied to or removed from a collar; that only the lugs *h* of the arched frame *a* rest on the horse's neck, and they are covered by a double thickness of leather, and that the pad will adapt itself to the neck of any horse; that the collar cannot become misplaced in its seat in the curved frame by reason of the curved projections *b c* of the frame; and that an air-chamber for the free circulation of air between the curved arched frame and the pad is arranged, with holes in the pad for the passage of air to the neck of a horse to ventilate it and keep it cool.

The pad may be made of wood, pressed paper, rubber, or any suitable material.

Having fully described my invention, what I claim as new, and desire to secure by Letters Patent, is—

1. The combination, with an arched metallic frame, of a perforated pad secured to the inner face of the frame, with an intermediate space, and adapted to hold said frame above and out of contact with the animal's neck, substantially as set forth.

2. The combination, with a rigid frame, of a perforated flexible pad secured to the lower edges of the inner face of said frame and forming an extended rest therefor, the said pad and frame being separated to permit of a free passage of air, substantially as set forth.

3. The combination, with an arched metallic frame, of a perforated flexible pad secured to opposite sides of said frame and forming an air-space between them, substantially as set forth.

4. The combination, with a horse-collar, of the metallic frame provided with the curved projections and straps, substantially as set forth.

5. The combination, with the arched metallic frame having the curved projections and lugs, of the perforated pad, and pieces of leather *k*, both secured to the lugs of the frame, with an air-space between the frame and pad, substantially as set forth.

FRIDERICK FRANK KANNE.

In presence of—

M. R. EVERITT,

FRANK TOUSLEY.